United States Patent [19]

Evers et al.

[11] 3,959,509

[45] *May 25, 1976

[54] FLAVORING FOODSTUFFS USING SULFUR-CONTAINING COMPOUNDS

[75] Inventors: William John Evers, Middletown; Manfred Hugo Vock, Locust; Igor Alexander Pelse, Long Branch, all of N.J.

[73] Assignee: International Flavors & Fragrances Inc., New York, N.Y.

[ * ] Notice: The portion of the term of this patent subsequent to July 1, 1992, has been disclaimed.

[22] Filed: May 21, 1975

[21] Appl. No.: 579,542

Related U.S. Application Data

[63] Continuation-in-part of Ser. No. 499,898, Aug. 23, 1974, Pat. No. 3,907,900.

[52] U.S. Cl. .............................................. 426/535
[51] Int. Cl.² ....................................... A23L 1/226
[58] Field of Search ................. 260/609 R; 426/535

[56] References Cited
UNITED STATES PATENTS

| | | | |
|---|---|---|---|
| 3,713,848 | 1/1973 | Katz | 426/535 |
| 3,907,900 | 9/1975 | Evers | 260/609 R |

*Primary Examiner*—Joseph M. Golian
*Attorney, Agent, or Firm*—Arthur L. Liberman; Harold Haidt

[57] ABSTRACT

The flavor of a foodstuff is altered, modified or enhanced by the addition thereto of one of the four compounds, the structure of which is one of the configurations of 3((2-mercapto-1-methylpropyl) thio)-2-butanol represented by the structures:

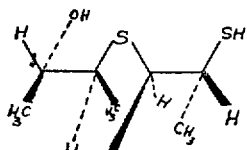

(Threo-Threo (I))

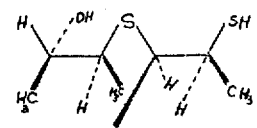

(Threo-Erythro (II))

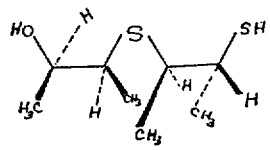

(Erythro-Threo (III))

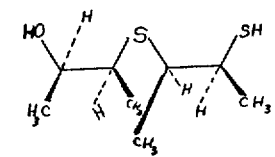

(Erythro-Erythro (IV))

Each of these configurations produced by the process described herein, of reacting either a cis or trans 2,3 butane episulfide with an "erythro" or "threo" 2-hydroxy-3-mercapto butane, represented by the structures:

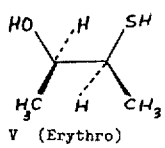

V (Erythro)

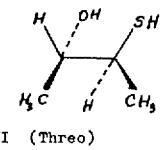

VI (Threo)

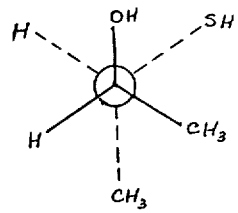

V (Erythro)

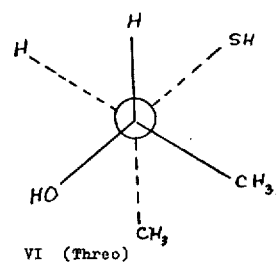

VI (Threo)

6 Claims, 8 Drawing Figures

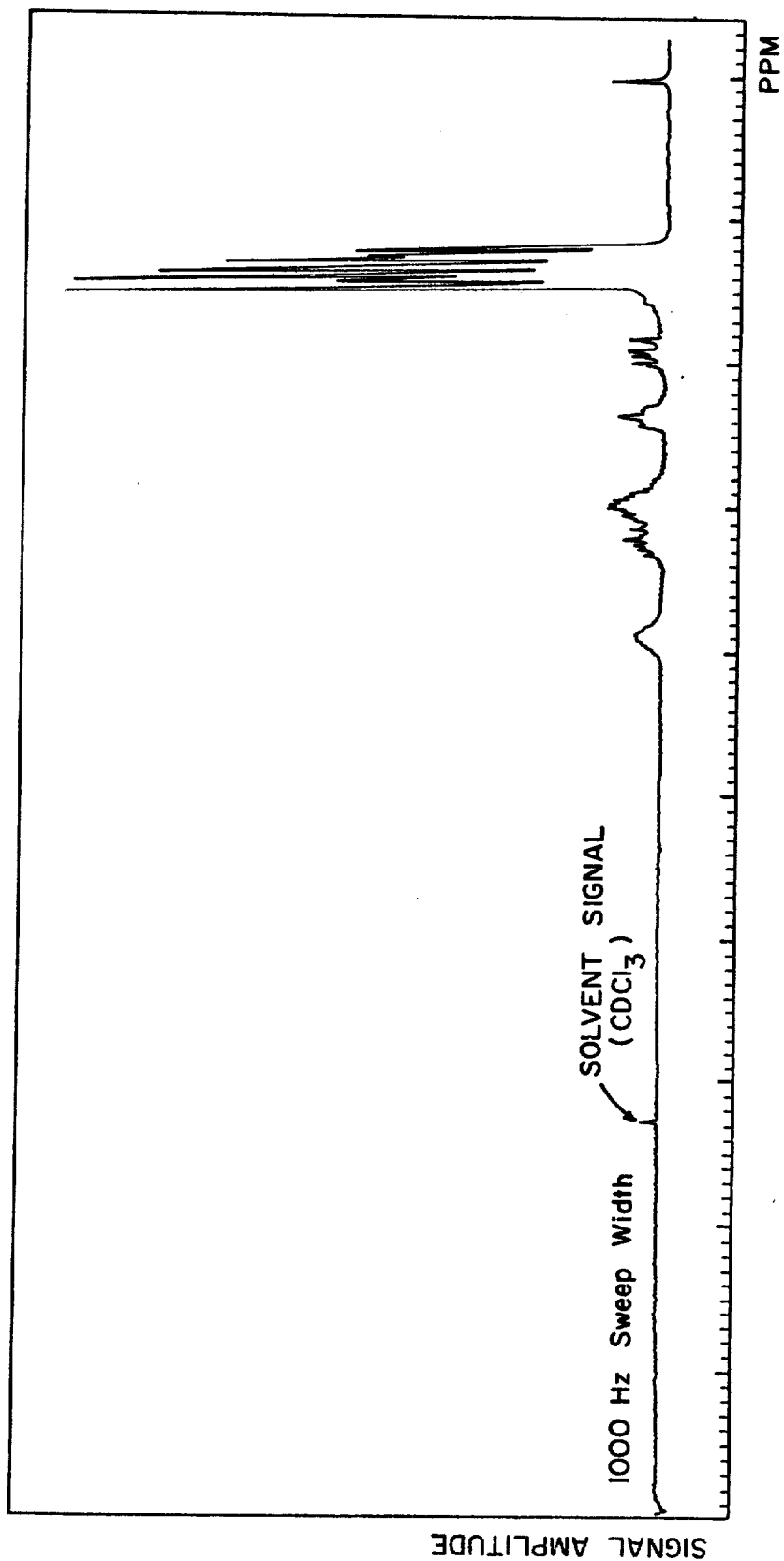
FIG. 1 EXAMPLE V

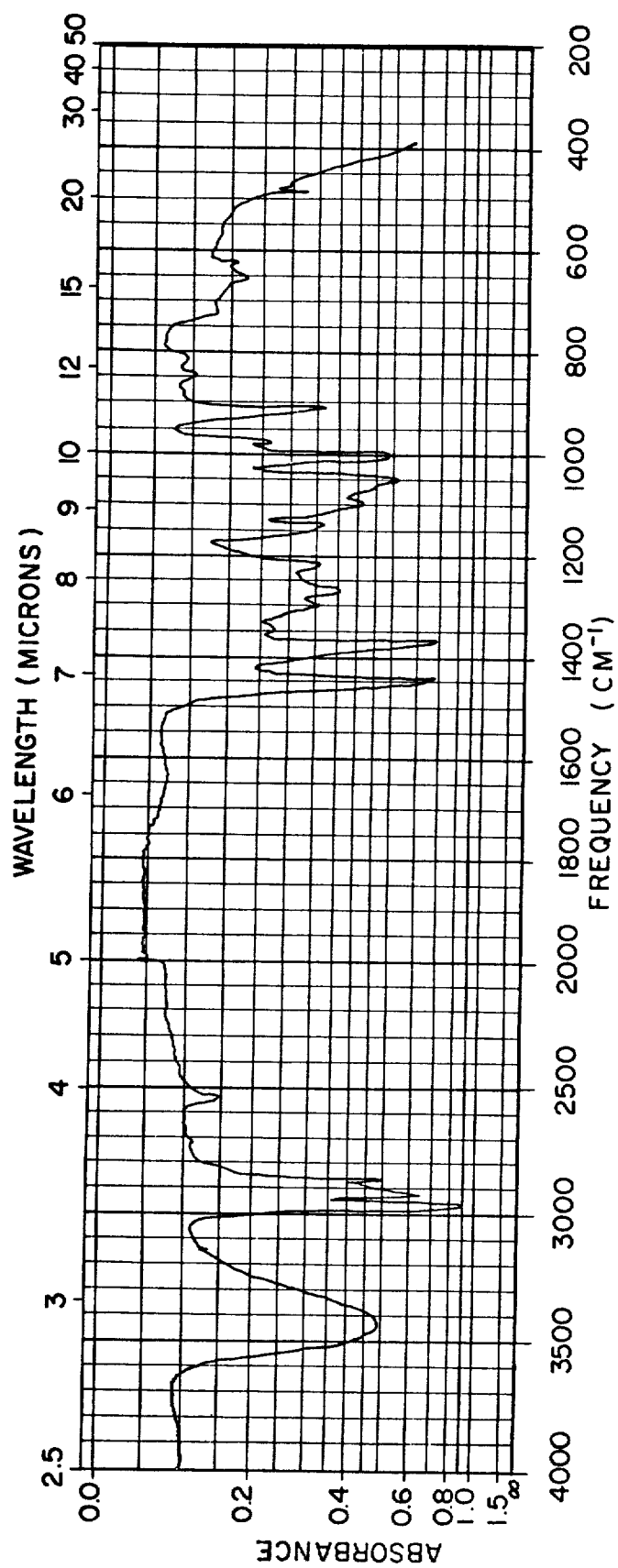
FIG. 2 EXAMPLE V

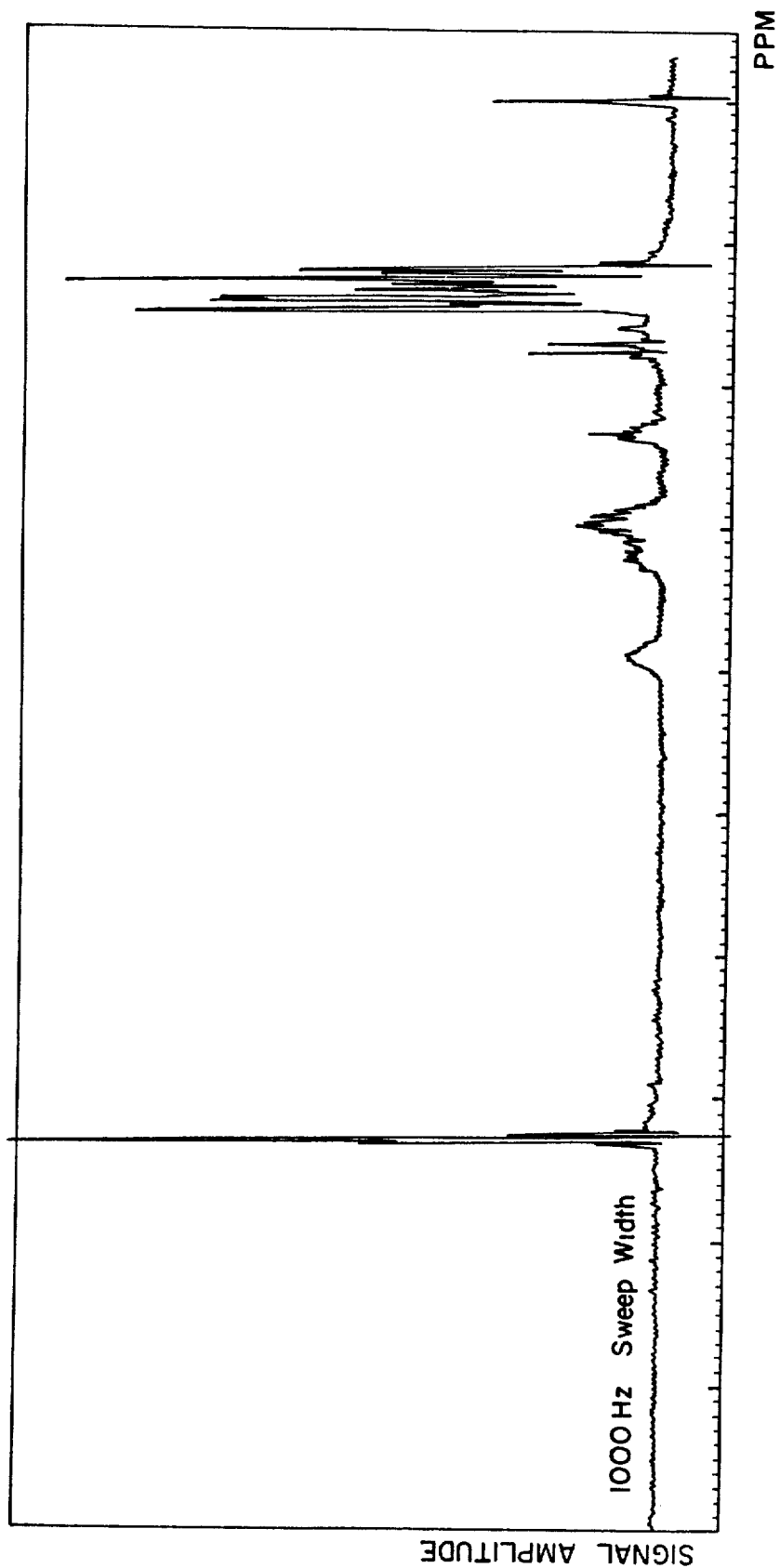
FIG. 3 EXAMPLE VI

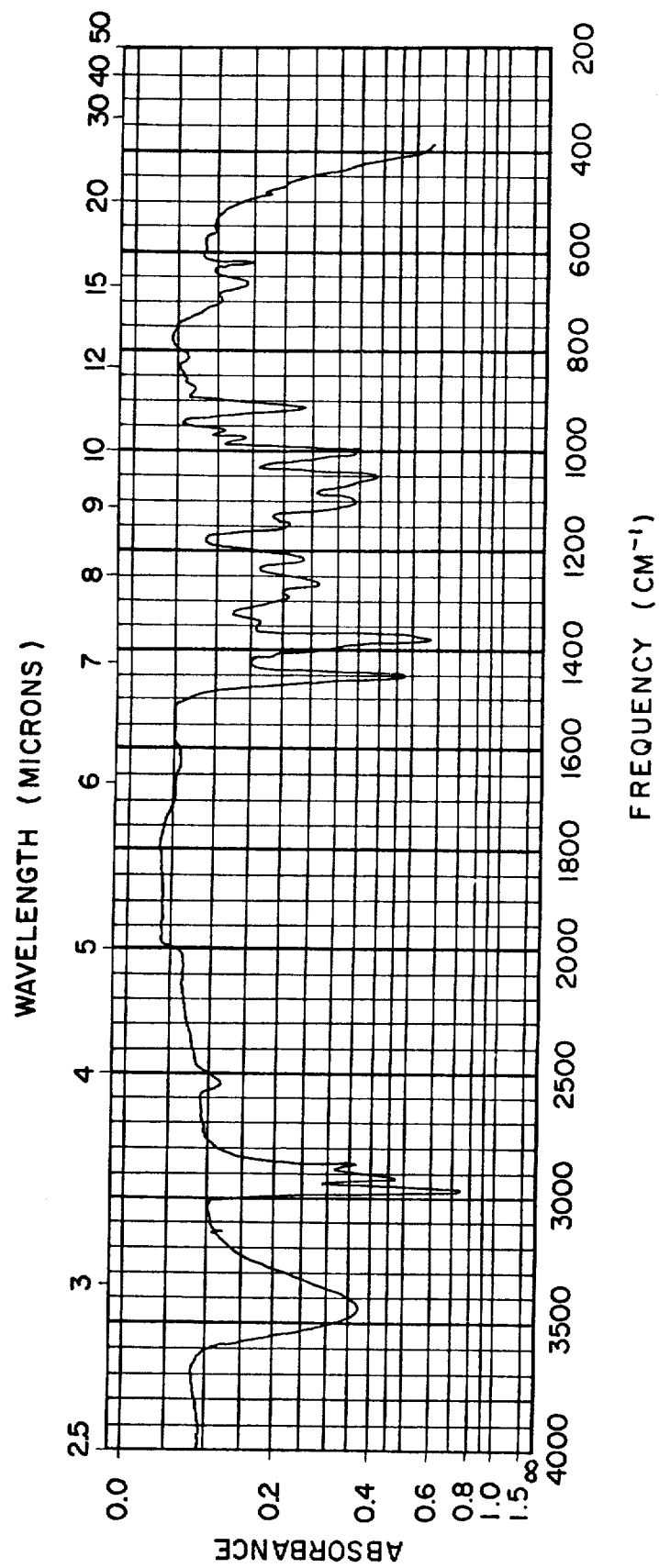
FIG. 4 EXAMPLE VI

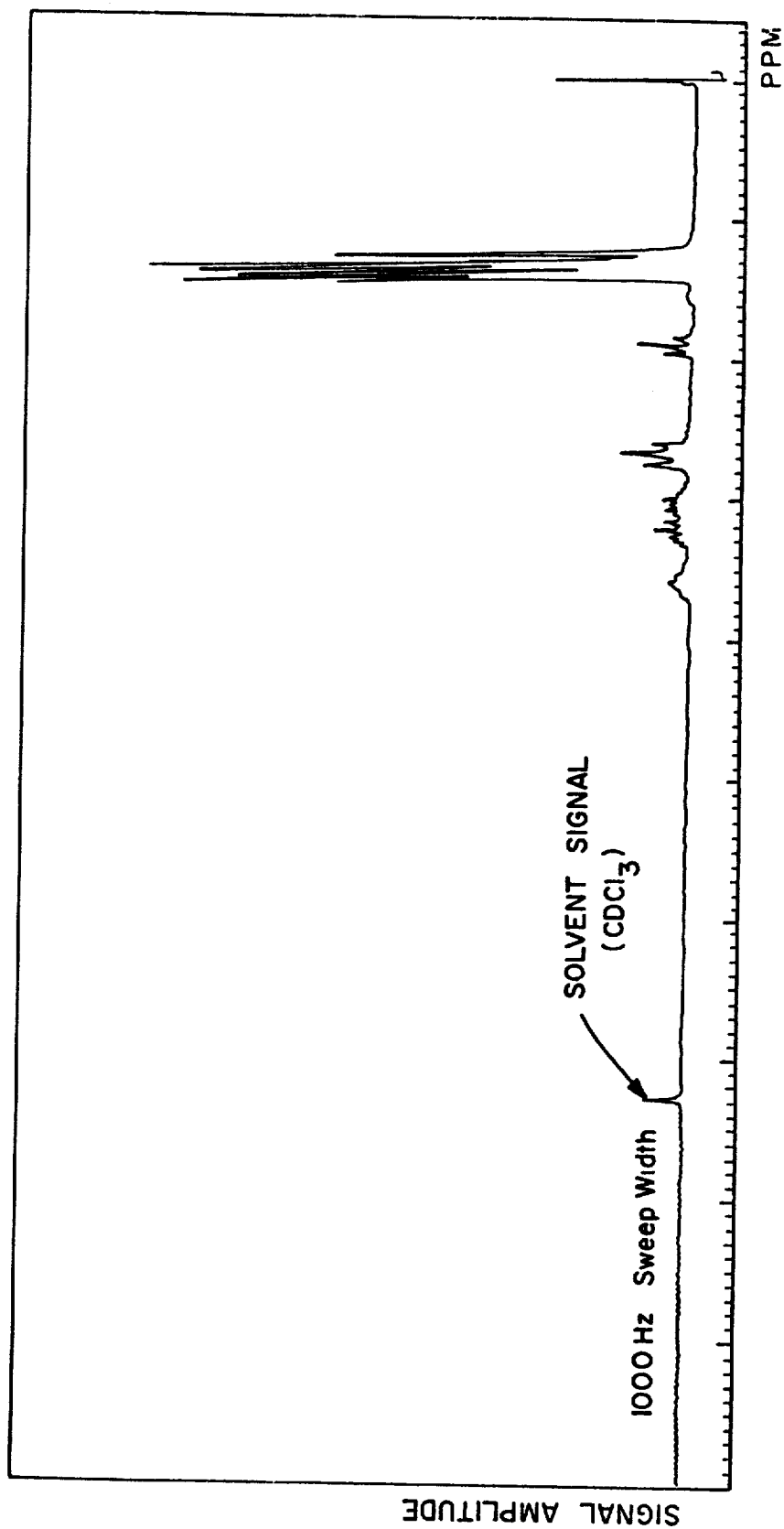
FIG.5 EXAMPLE VII

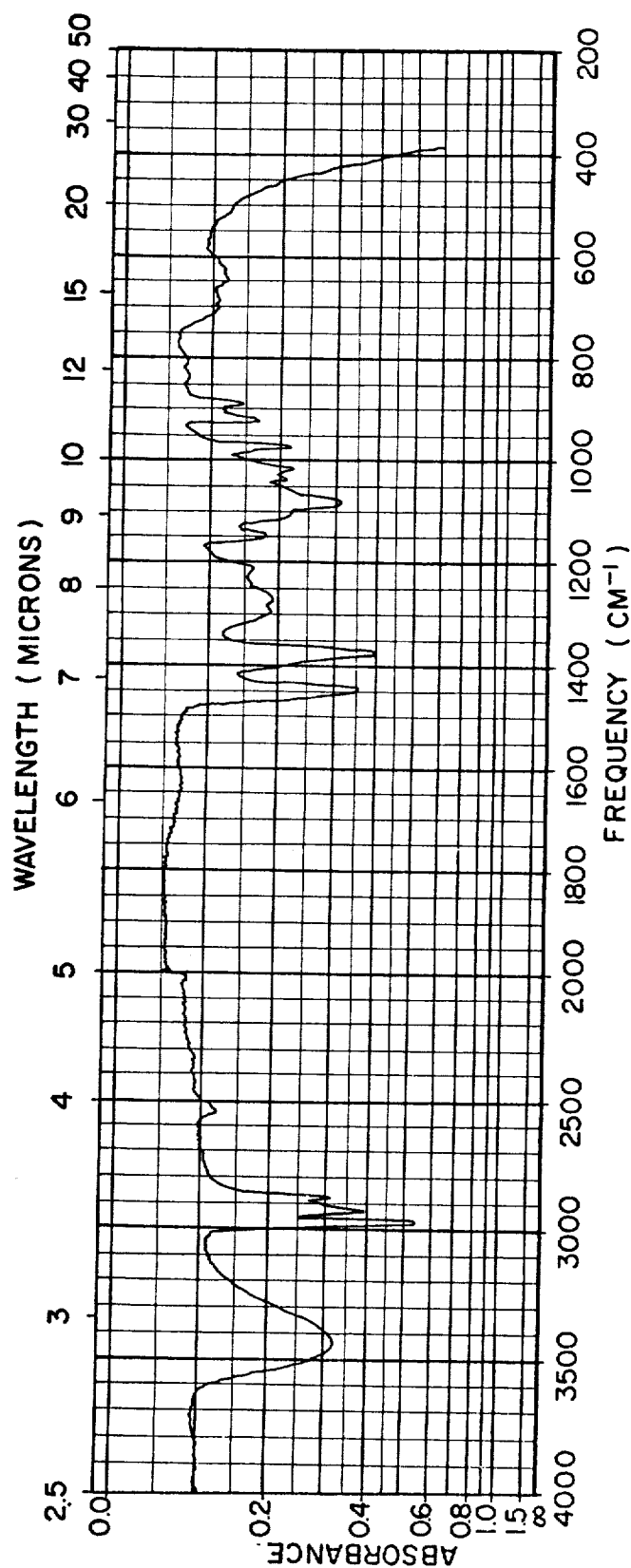
FIG. 6 EXAMPLE VII

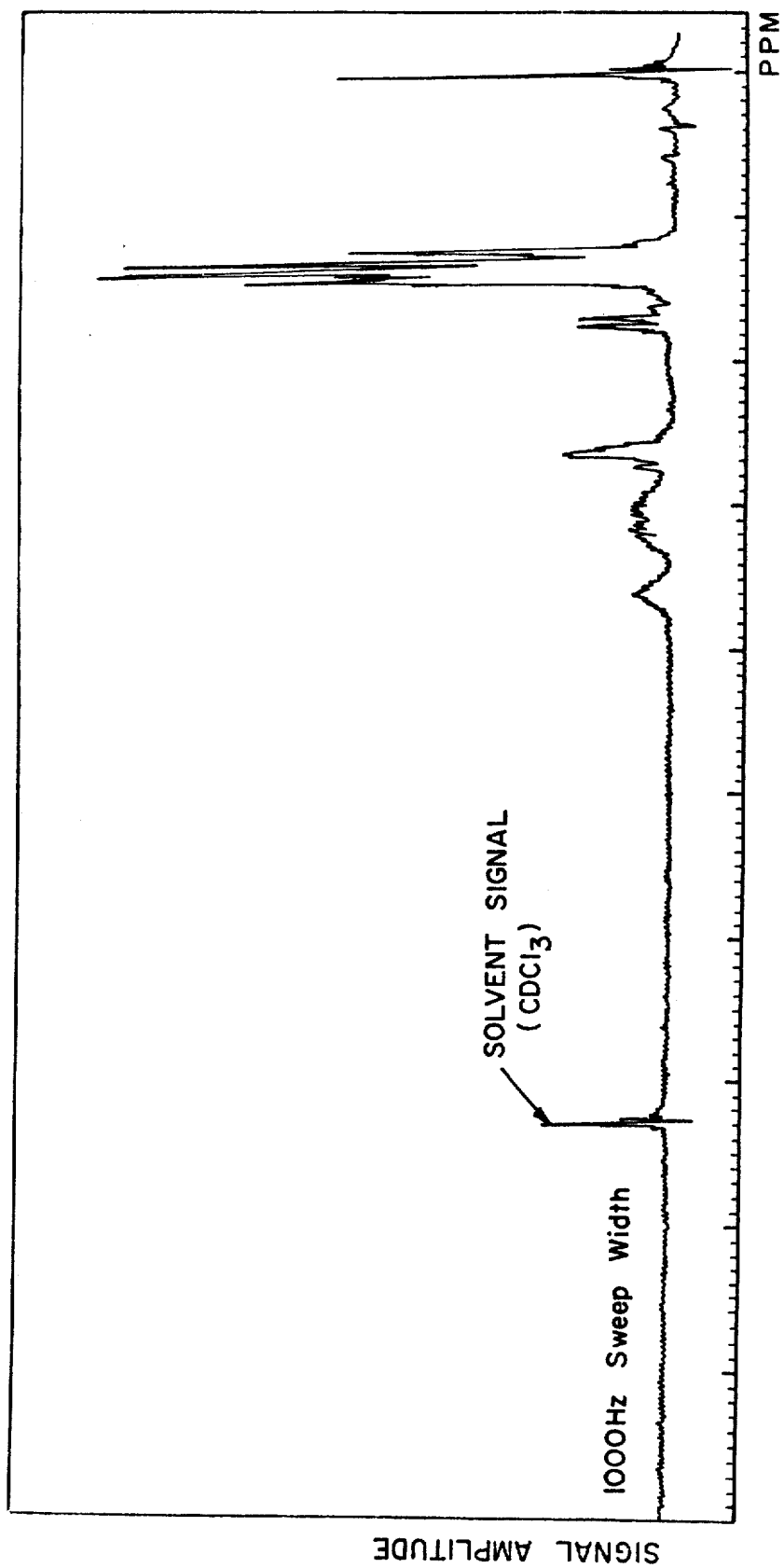
FIG. 7 EXAMPLE VIII

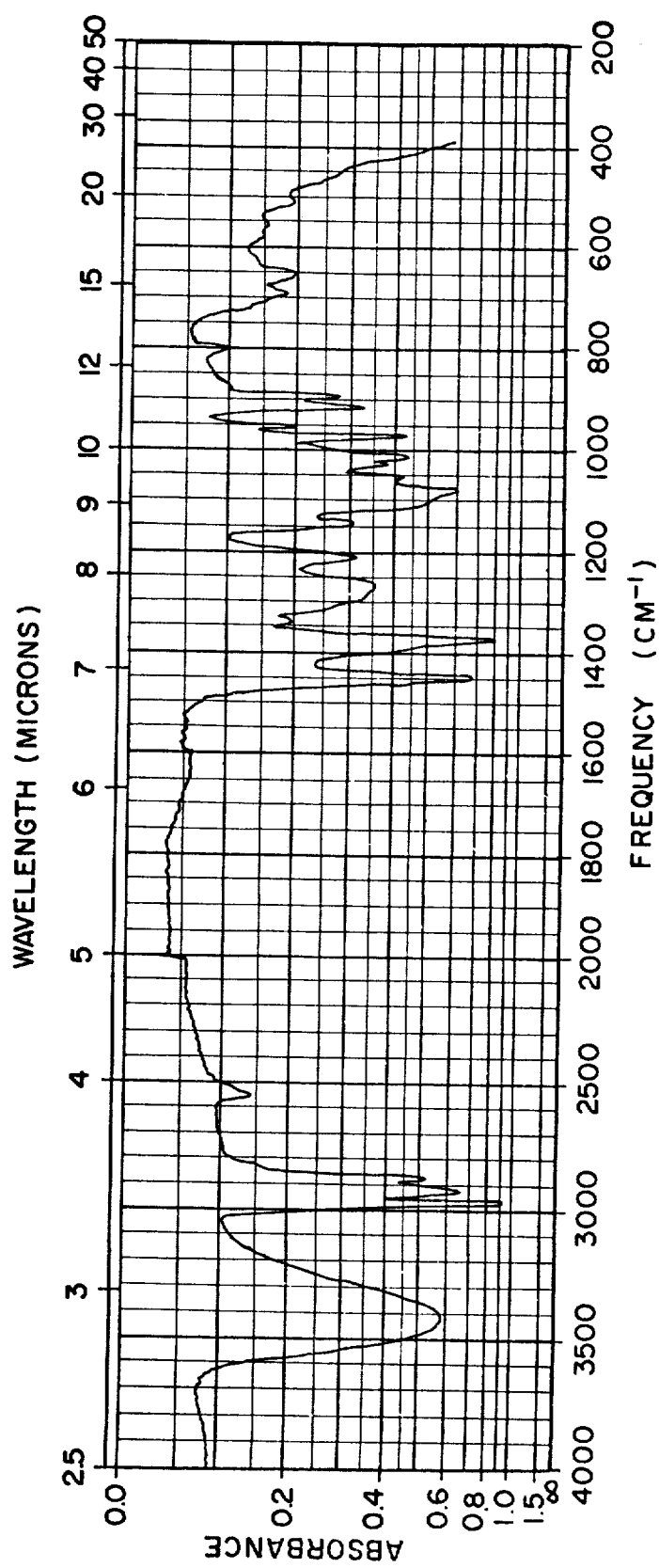
FIG. 8 EXAMPLE VIII

FLAVORING FOODSTUFFS USING SULFUR-CONTAINING COMPOUNDS

This application is a Continuation-in-Part of Application of U.S. Letters Patent Ser. No. 499,898 filed on Aug. 23, 1974 now U.S. Pat. No. 3,907,900.

BACKGROUND OF THE INVENTION

This invention has to do with altering, modifying or enhancing the aroma and flavor properties of foodstuffs. More particularly, the invention relates to the use of certain configurations of 3((2-mercapto-1-methylpropyl)thio)-2-butanol having the structures:

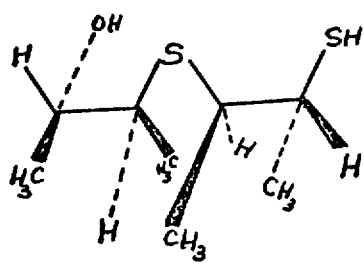

(Threo-Threo; (I))

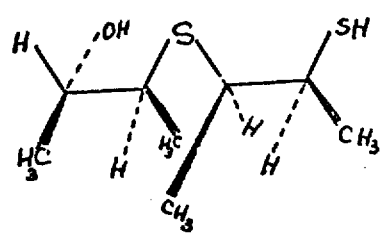

(Threo-Erythro; (II))

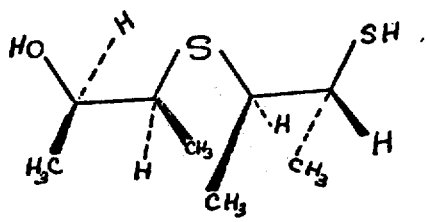

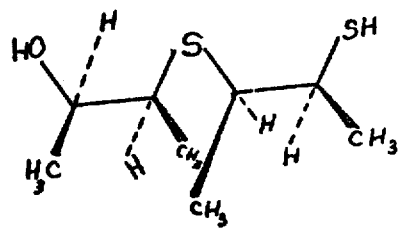

to modify, enhance or alter the flavor characteristics of a foodstuff. Contemplated are processes and compositions for altering the flavor of foodstuffs and processes for preparing the said 3((2-mercapto-1-methylpropyl)thio)-2-butanol configuration.

The terms "alter" and "modify" in their various forms are used herein to mean the supplying or imparting of a flavor or aroma characteristic or note to an otherwise bland, relatively tasteless or non-odorous substance, or augmenting an existing flavor or aroma characteristic where the natural flavor or intrinsic odor is deficient in some regard, or supplementing the existing flavor or aroma impression to modify its quality, character, taste or aroma.

The term "enhance" is used herein to mean the intensification of a flavor or aroma note already present in a flavor formulation or in a foodstuff.

The term "foodstuff" as used herein includes both solid and liquid ingestible materials which usually do, but need not have nutritional value. Thus, foodstuffs include meats, gravies, soups, convenience foods, beverages, dairy products, candies, vegetables, cereals, soft drinks, snacks and the like.

The reproduction of roasted meat, liver and alliacious flavors has been the subject of a long and continuing search by those engaged in the production of foodstuffs. The shortage of foods, especially protein foods, in many parts of the world has given rise to a need for utilizing non-meat sources of protein and for making such protein as palatable and meat-like as possible. In addition, various techniques utilized in processing food detract from their flavor quality or give rise to off-flavors. Convenience or "snack" foods are increasing in volume and they require flavoring. Accordingly, materials capable of closely simulating, improving, or even exactly duplicating the flavor and aroma of roasted products and roasted meat, liver and alliacious (e.g., onion and garlic) products have long been sought.

PRIOR ART

Various alkane thiols and alkane mercapto sulfides have been suggested as flavoring agents. Thus, U.S. Letters Pat. No. 3,653,920 which issued on Apr. 4, 1972 states that certain alkane thiol sulfides, such as 2-thiobutane thiol, can be used to impart a meat flavor to foods; and U.S. application Ser. No. 135,337, filed Apr. 19, 1971, describes various branched chain alkane thiols, such as 2-methyl-3-butane thiol, and suggests their use for imparting roasted meat aroma and taste. 3((2-Mercapto-1-methylpropyl)thio)-2-butanol, broadly, is taught as a flavoring agent in copending application for U.S. Letters Patent Ser. No. 354,304 filed on Apr. 25, 1973 (now U.S. Pat. No. 3,892,878, issued on July 1, 1975) but the specific organoleptic attributes of the four following configurations of 3((2-mercapto-1-methylpropyl)thio)-2-butanol are not disclosed.

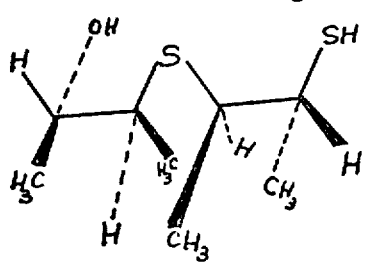
(Threo-Threo (I))

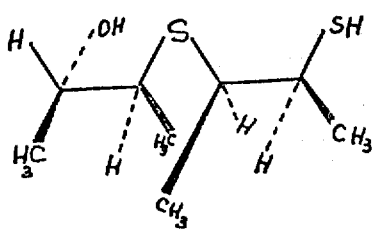
(Threo-Erythro (II))

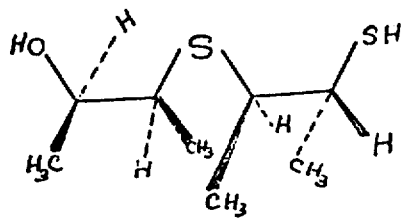
(Erythro-Threo (III))

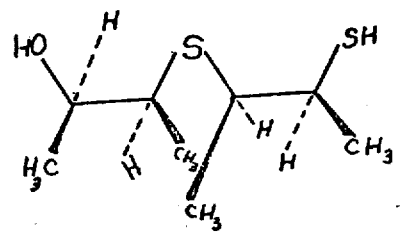
(Erythro-Erythro (IV))

SUMMARY OF THE INVENTION

In accordance with this invention a series of four sulfur-containing compounds having four configurations of 3((2-mercapto-1-methylpropyl) thio)-2-butanol have been provided for altering the roasted meat, liver or alliacious flavor of foodstuffs. These configurations of 3((2-mercapto-1-methylpropyl) thio)-2-butanol useful in this regard may be represented by the following structures:

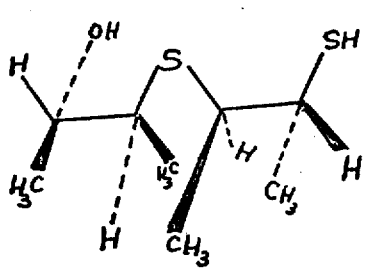
(Threo-Threo (I))

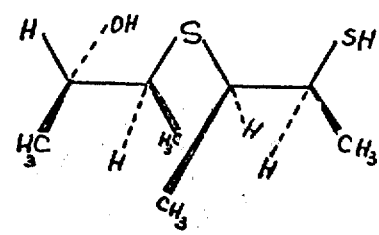
(Threo-Erythro (II))

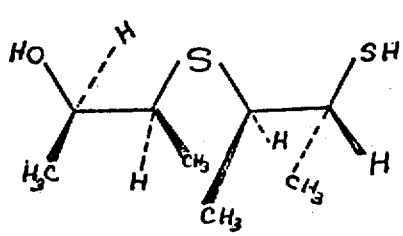
(Erythro-Threo (III))

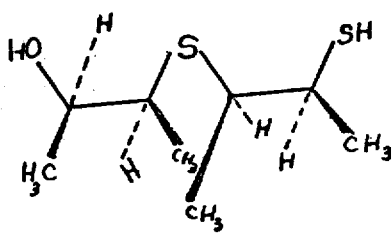
(Erythro-Erythro (IV))

Each configuration is prepared by reacting a "cis" or "trans" 2,3-butane episulfide with an "erythro" or "threo" 2-hydroxy-3-mercapto butane having one of the structures:

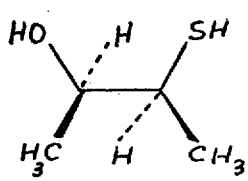
(V (Erythro))

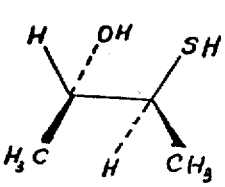
(VI (Threo))

These structures may also be represented as follows:

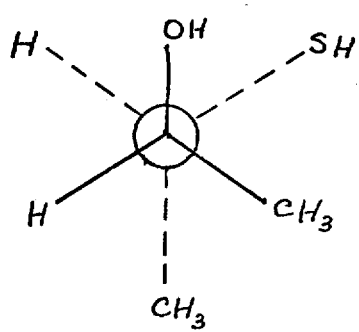

(V (Erythro))

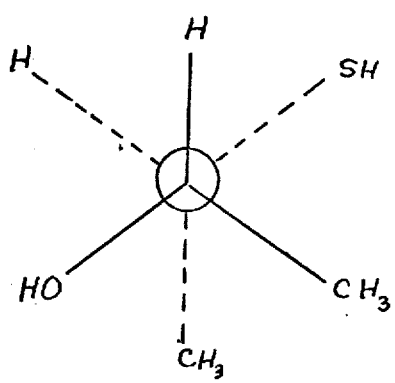

(VI (Threo))

DESCRIPTION OF THE PREFERRED EMBODIMENTS

The 3((2-mercapto-1-methylpropyl) thio)-2-butanol configurations of this invention are primarily useful in roasted meat, liver and aliacious flavor compositions. They are especially suitable as flavors by reason of the wide range of useful concentrations at which they can be applied. Most flavor chemicals become objectionable in character at some point not too greatly above their threshhold value. The 3((2-mercapto-1-methylpropyl) thio)-2-butanol configurations of the present inventtion have been found to be still suitable versatile and inoffensive at proportions well in excess of their threshhold value and substantially above the multiple of their threshhold at which other flavor chemicals are objectionable.

The threshhold value of the 3((2-mercapto-1-methylpropyl) thio)-2-butanol configurations may range from 0.1 parts per million to 0.2 parts per million and, therefore, normally would be used at levels of from about 0.1 parts per million to about 10 parts per million, but can actually be used without imparting an objectionable character up to about 30 parts per million based on the total weight of the foodstuff.

The actual amount used will vary depending upon a variety of factors including the particular flavoring agent used, the flavor effect desired, cost considerations, the amount and type of other ingredients present, the foodstuff to be flavored and the processing and storage conditions to which the foodstuff will be subjected. It should be kept in mind that larger concentrations do not necessarily give equivalent incremental flavor enhancement. In those instances where the particular 3((2-mercapto-1-methylpropyl) thio)-2-butanol configuration is added to the foodstuff as an essential and integral part of a flavoring composition, it is necessary that the total quantity of flavoring composition employed be sufficient to yield an effective 3((2-mercapto-1-methylpropyl) thio)-2-butanol configuration concentration, i.e., sufficient to alter the organoleptic characteristics to which it is added or incorporated.

The 3((2-mercapto-1-methylpropyl) thio)-2-butanol configurations according to this invention are shown in the following tabulation which includes the structure, common name and description of the flavor character of the compound at a typical use concentration noted in parts per million (ppm).

TABLE I

| Compound: | Structure: |
|---|---|
| Erythro-Erythro 3(2-mercapto-1-methyl-propyl) thio)-2-butanol | |

| Flavor Character: | Use Concentration: |
|---|---|
| At 0.1 ppm, sulfury roasted weak metallic taste. At 0.5 ppm, sulfury, metallic, heat oniony taste, weak, burning, oniony after taste. | 0.1 – 10 ppm |

TABLE I-continued

| Compound | Structure |
|---|---|
| Erythro-Threo-3((2-mercapto-1-methylpropyl) thio)-2-butanol | (structure shown) |

| Flavor Character: | Use Concentration: |
|---|---|
| At 0.1 ppm, sulfury, roasted, metallic taste; slightly stronger than erythro-erythro 3((2-mercapto-1-methylpropyl) thio)-2-butanol. At 0.5 ppm, sulfury, roasted, metallic, weak, bloody, hydrolyzed vegetable protein-like after taste; but no oniony notes. | 0.1 – 10 ppm |

| Compound: | Structure: |
|---|---|
| Threo-Erythro 3((2-mercapto-1-methylpropyl) thio)-2-butanol | (structure shown) |

| Flavor Character: | Use Concentration: |
|---|---|
| At 0.1 ppm, a sweet, roasted, metallic, liver-like taste; At 0.5 ppm, stronger liver-like and roasted notes. | 0.1 ppm – 20 ppm |

| Compound: | Structure: |
|---|---|
| Threo-Threo 3((2-mercapto-1-methylpropyl) thio)-2-butanol | (structure shown) |

| Flavor Character: | Use Concentration: |
|---|---|
| At 0.2 ppm only garlic-like notes; no meaty notes; At 0.5 ppm, characteristic garlic aroma and taste; roasted notes with a burning after taste; At 1.0 ppm strong garlic metallic, roasted garlic notes. | 0.1 – 30 ppm |

The 3((2-mercapto-1-methylpropyl) thio)-2-butanol configuration contemplated as flavoring agents by the present invention are novel compounds and are prepared by the novel processes of this invention as further exemplified herein.

The structures set forth in illustrating the 3((2-mercapto-1-methylpropyl) thio)-2-butanol configurations of our invention are each intended to represent single and in admixture optical isomers of each particular configuration. Thus, for example, the structure:

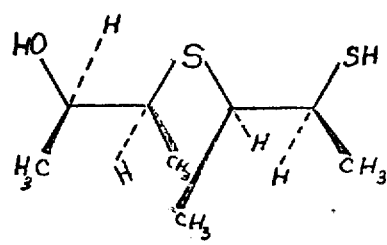

illustrating erythro-erythro 3((2-mercapto-1-methylpropyl) thio)-2-butanol is intended to read singly and in admixture the resultant racemates each of which is made up of a dextro and laevo rotatory form.

The process of our invention involves the reaction of "cis" or "trans" 2,3-butane episulfide with "erythro" 3-mercapto-2-butanol or "threo" 3-mercapto-2-butanol. The particular resulting 3((2-mercapto-1-methylpropyl) thio)-2-butanol configuration is directly dependent on whether the "cis" or "trans" 2,3-butane episulfide is reacted with the "erythro" or "threo" 3-mercapto-2-butanol.

Hence, erythro-erythro 3((2-mercapto-1-methylpropyl) thio)-2-butanol (or "erythro-erythro form") having the structure:

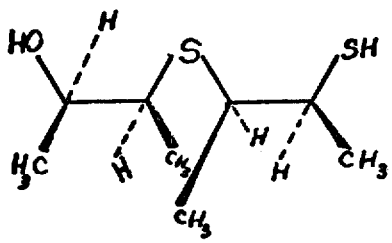

is produced by reacting erythro-3-mercapto-2-butanol with trans-2,3-butane episulfide. Erythro-threo 3((2-mercapto-1-methylpropyl) thio)-2-butanol (or "erythro-threo form") having the structure:

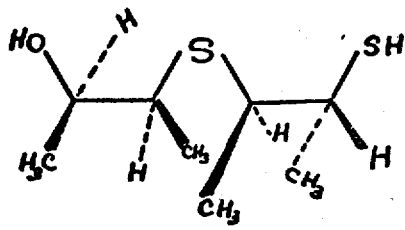

is produced by reacting erythro-3-mercapto-2-butanol with cis-2,3-butane episulfide. Threo-threo 3((2-mercapto-1-methylpropyl) thio)-2-butanol (or "threo-threo form") having the structure:

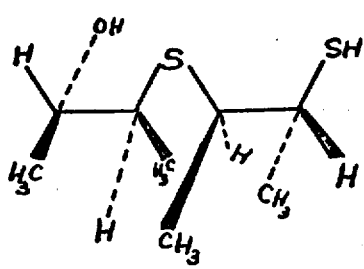

is produced by reacting threo-3-mercapto-2-butanol with cis-2,3-butane episulfide. Threo-erythro 3((2-mercapto-1-methylpropyl) thio)-2-butanol (or "threo-erythro form") having the structure:

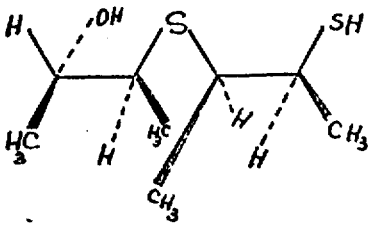

is produced by reacting threo-3-mercapto-2-butanol with trans-2,3-butane episulfide.

The reaction of the threo or erythro 3-mercapto-2-butanol with the cis or trans-2,3-butane episulfide is carried out in the presence of an amine base catalyst such as methyl amine, ethyl amine, propyl amine, dimethyl amine, diethyl amine, ethanol amine, diethanolamine, triethanolamine, triethanol amine pyride, piperidine, pyrazine, picoline, aniline trimethyl amine, pyrolle, methyl pyrazine, 2,3-dimethyl pyrazine, 1-methyl pyrrole and 1-phenyl pyrrole. A preferred catalyst is diethyl amine because of its low cost and ease of availability.

The catalyst concentration is preferably from 0.1% up to 1.0% with a concentration of 0.5% being preferred.

The reaction temperature range is from 25°C up to 80°C with a temperature range of 50°-60°C being preferred.

The preferred mole ratio of reactants is 1:1 but mole ratios of episulfide:mercaptobutanol of from 0.25:1 up to 1:5 are operable.

It is also preferable that the reaction be carried out in an inert (or nonreactive) solvent which is usable with the desired reaction temperature range of 25°C up to 80°C. Such a solvent is methanol; but other solvents having boiling points at atmospheric pressure greater than 50°C are usable such as ethanol, isopropanol, isobutyl alcohol, tetrahydrofuran and cyclohexanol.

The concentration of reactant in solvent may vary from 10 gm/liter up to 500 gm/liter with a concentration range of 30–100 gm/liter (total quantity of reactant/total solvent) being preferred.

At the end of the reaction, the reaction mass is acidified in order to neutralize the amine catalyst. The reaction mass is then "worked-up" using standard unit operations such as extraction, drying, evaporation and fractional distillation.

The erythro and threo 3-mercapto-3-butanol compounds which are reactants having the structures:

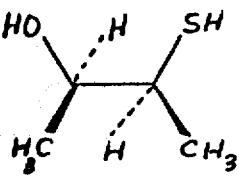

(V (Erythro))

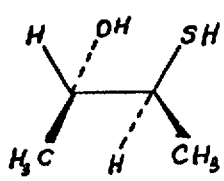

(VI (Threo))

which may also be represented as follows:

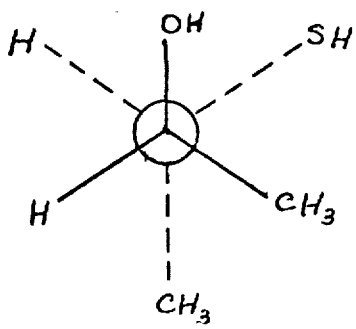

(V (Erythro))

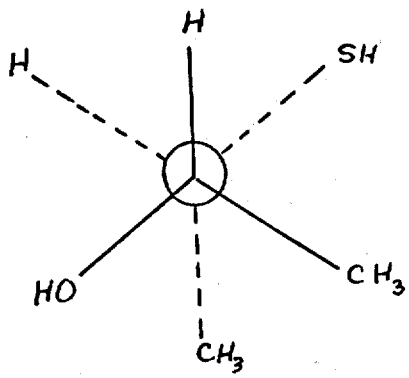

(VI (Threo))

are prepared by reaction of hydrogen sulfide with cis or trans 2,3-epoxybutane.

Erythro-3-mercapto-2-butanol is prepared by reacting $H_2S$ with trans-2,3-epoxybutane. Threo-3-mercapto-2-butanol is prepared by reacting cis-2,3-epoxybutane with $H_2S$.

The reaction is preferably carried out at atmospheric pressure and a temperature in the range of 50°–60°C in an inert solvent such as a lower alkanol; preferably methanol and in the presence of an amine catalyst, such as methyl amine, ethyl amine, pyridine, pyrazine, pyrrole and diethyl amine. Diethyl amine is preferred. At the end of the reaction, the reaction mass is acidified so as to neutralize the amine catalyst; and "worked-up" by means of such standard unit operations as extraction, drying, evaporation, and fractional distillation.

The concentration of 2,3-epoxybutane reactant in solvent may vary from 10 g/liter up to 500 g/liter with a concentration range of 30–100 g/liter being preferred.

The catalyst concentration is preferably from 0.1% up to 1.0% with a concentration of 0.5% being preferred.

The 3((2-mercapto-1-methylpropyl)thio)-2-butanol configurations described herein may be employed either singly or in admixtures comprising two or more thereof. Admixtures of two or more 3((2-mercapto-1-methylpropyl)thio)-2-butanol configurations offer the advantages of combining the beneficial and organoleptic qualities of each of the compounds into a total impact which is superior or different from the characteristics of the sole ingredient. The formulator can simulate a wide variety of organoleptic characteristics to evoke a predetermined taste response on the part of the consumer.

Generally in use the 3((2-mercapto-1-methylpropyl)thio)-2-butanol configurations are admixed with one or more auxiliary flavoring adjuvants. The precise adjuvants employed will depend upon the ultimate use contemplated and the organoleptic character desired. Flavoring adjuvants are recognized in the art and are ingestibly acceptable or non-toxic. Such flavoring adjuvants include stabilizers, thickeners, surface active agents, conditioners, flavorants and flavor intensifiers.

Stabilizers include preservatives, e.g., sodium chloride, antioxidants, e.g., calcium and sodium ascorbate, ascorbic acid, butylated hydroxyanisole (mixture of 2 and 3 tertiary butyl-4-hydroxyanisole), butylated hydroxy toluene (2,6-di-tertiary-butyl-4-methyl phenol), propyl gallate and the like, sequestrants, e.g., citric acid.

Thickeners include carriers, binders, protective colloids, suspending agents, emulsifiers and the like, e.g., agar-agar; carrageenan; cellulose and cellulose derivatives such as carboxymethyl cellulose and methyl cellulose; natural and synthetic gums such as gum arabic, gum tragacanth; and proteinaceous materials such as gelatin; lipids, carbohydrates; starches; pectins and emulsifiers, e.g., mono- and diglycerides of fatty acids.

Surface active agents include emulsifying agents, e.g., fatty acids such as capric acid, caprylic acid, palmitic acid, myristic acid and the like, mono- and diglycerides of fatty acids, lecithin, defoaming and flavor-dispersing agents such as sorbitan monostearate, potassium stearate; hydrogenated tallow alcohol and the like.

Conditioners include compounds such as bleaching and maturing agents, e.g., benzoyl peroxide, calcium peroxide, hydrogen peroxide and the like; starch modifiers such as peracetic acid, sodium chlorite, sodium hypochlorite, propylene oxide, succinic anhydride and the like; buffers and neutralizing agents, e.g., sodium acetate, ammonium bicarbonate, ammonium phosphate, citric acid, lactic acid, vinegar and the like; colorants, e.g., carminic acid, cochineal, tumeric and curcumin and the like; firming agents such as aluminum sodium sulfate, calcium chloride and calcium gluconate; texturizers; anti-caking agents, e.g., aluminum calcium sulfate and tribasic calcium phosphate; enzymes; yeast foods, e.g., calcium lactate and calcium sulfate; nutrient supplements, e.g., iron salts such as ferric phosphate, ferric pyrophosphate, ferrous gluconate and the like; riboflavin; vitamins; zinc sources such as zinc chloride, zinc sulfate and the like.

Flavorants and flavor intensifiers include organic acids, e.g., fatty saturated, unsaturated and amino acids; alcohols, e.g., primary and secondary alcohols; esters; carbonyl compounds including aldehydes and ketones; lactones; cyclic organic materials including benzene derivatives; alicyclics, heterocyclics such as furans, pyridines, pyrazines and the like; sulfur-containing materials including thiazoles, thiols, sulfides, disulfides and the like; so-called flavor potentiators such as monosodium glutamate, guanylates, inosinates;

natural and synthetic flavorants such as vanillin, natural gums and the like; spices; herbs; essential oils and extractives including anise, anise oil, alkanet root extract, bay leaves, capsicum extract and the like.

The specific flavoring adjuvant selected for use may be either solid or liquid, depending upon the desired physical form of the ultimate product, i.e., foodstuff, whether simulated or natural, and should, in any event, be capable of providing an environment in which the 3((2-mercapto-1-methylpropyl) thio)-2-butanol configurations can be dispersed or admixed to provide a homogeneous medium. In addition, selection of one or more flavoring adjuvants as well as the quantities thereof will depend upon the precise organoleptic character desired in the finished product; thus, in the case of flavoring compositions, ingredient selection will vary in accordance with the foddstuff to which the flavor and aroma are to be imparted. In contra-distinction, in the preparation of solid products, e.g., simulated foodstuffs, ingredients capable of providing normally solid compositions should be selected such as various cellulose derivatives.

The preferred flavoring adjuvants which are used in combination with at least one 3((2-mercapto-1-methylpropyl) thio)-2-butanol configuration include: 4-methyl-5-(beta-hydroxy ethyl) thiazole, ethyl thioacetate, furfural, benzaldehyde, methional, hexanal, diacetyl, amyl alcohol, ethyl disulfide, methyl mercaptan, 2,4-decadienal, 2,4-decadienol, 2,5-dimethyl-2,5-dihydroxy-1,4-dithiane, 1,3-dithiolane, 2-methyl-1,3-dithiolane, 3,5-dimethyl-1,2-dithiolane, 3-methyl-1,2-dithiolane, 2,4-dimethyl-1,3-dithiolane, 4-methyl-1,3-dithiolane, 1,2-dithiane, 1,3-dithiane, 1,4-dithiane, 2-methyl-1,3-dithiane, 2,4-dimethyl-1,3-dithiane, 4-methyl-1,3-dithiane, 2,4,6-trimethyl-1,3-dithiane, thiamine hydrochloride, 2-methyl-1-butanethiol, 4-mercapto-2-butanone, 3-mercapto-2-pentanone, furfuryl alcohol, 2-mercapto propionic acid, methyl pyrazine, 2-ethyl-3-methyl pyrazine, tetrahydrofurfuryl alcohol, tetrahydrothiophen-3-one, tetramethyl pyrazine, dipropyl disulfide, methyl benzyl disulfide, 2-butyl thiophene, 2,3-dimethyl thiophene, 5-methylfurfural, 3-acetyl-2,5-dimethyl-furan, guaiacol, phenyl acetaldehyde, deltadecalactone, d-limonene, acetoin, amyl acetate, maltol, ethyl butyrate, levulinic acid, piperonal, ethyl acetate, n-octanal, n-pentanal, 2-isobutyl thiazole, propyl propenyl disulfide, 3-mercapto-2,5-dimethylfuran, methyl-3-(2,5-dimethylfuryl) disulfide, propyl propenyl trisulfide, 2,6-dimethyl pyrazine, acetophenone, 2-methyl-2-butenal, furfuryl mercaptan, acetyl propionyl, 3-thioacetyl-2,5-dimethylfuran, bis-3-(2,5-dimethylfuryl) disulfide and bis-3-(2-methylfuryl) disulfide.

Flavoring compositions prepared in accordance with the present invention preferably contain one or more 3((2-mercapto-1-methylpropyl) thio)-2-butanol configurations in concentrations ranging from about 1 × $10^{-9}$ to 25% by weight, based on the total weight of said flavoring compositions, but may contain as much as 80 or 90% by weight of the 3((2-mercapto-1-methylpropyl) thio)-2-butanol configuration, if the flavoring composition is then applied in small amount.

All parts, proportions, percentages and ratios herein are by weight unless otherwise indicated.

It will be understood by those skilled in the art that the alkane dithiol, mercapto alkanol, alkane dimercapto sulfide and alkane hydroxy mercapto sulfide can be added to the materials to be flavored or aromatized at any convenient point in the production of the consumable material by any of the conventional techniques including spray drying, blending, stirring, dissolving and the like. Thus, when they are used to alter or otherwise vary the flavor of a foodstuff, they can be added in the original mixture, emulsion, preparation, or the like, prior to any cooking or heating operation. Alternatively, they can be added at a later stage of processing if volatilization losses would be excessive during the earlier processing.

The following examples are given to illustrate embodiments of the invention as it is now preferred to practice it. It will be understood that these examples are illustrative, and the invention is not to be considered as restricted thereto except as indicated in the appended claims.

EXAMPLE I

SYNTHESIS OF
ERYTHRO-3-MERCAPTO-2-BUTANOL

Into a 250 ml three-necked flask equipped with heating mantle, condenser, hydrogen sulfide addition tube and magnetic stirrer, the following materials are added:

| Ingredients | Parts |
|---|---|
| Diethyl amine | 0.5 cc |
| Methanol | 100 ml |

Hydrogen sulfide is bubbled through the reaction mass for a period of 0.5 hours at which time, 0.8 grams of trans-2,3-epoxybutane is added. At the end of 1 hour, while maintaining the temperature at 53°–55°C, 1.1 grams of trans-2,3-epoxybutane is added. After 3 hours, H$_2$S addition is ceased. The reaction mass remains overnight at room temperature. At the commencement of heating, 1.8 grams of additional trans-2,3-epoxybutane is added to the reaction mass and H$_2$S addition is continued for a period of 6.5 hours while maintaining the temperature at 56°C. At the end of the 6.5 hour period, H$_2$S addition ceases and the reaction mass is allowed to remain at room temperature overnight. The reaction mass is then heated to 54°C, and an additional 4.5 grams of trans-2,3-epoxybutane is added while maintaining the reaction mass at a temperature of 54°C. The reaction mass is heated to 54°C for a period of 5 hours. At the end of 3 hours, 1.3 grams of additional trans-2,3-epoxybutane is added.

The reaction mixture is then poured into 100 cc of water. To this mass, dilute hydrochloric acid is added until the reaction mass is slightly acidic. The reaction mass is then extracted with two portions (50 ml each) of methylene dichloride, dried and concentrated to 6.4 grams of crude oil. The 6.4 grams of crude oil is charged to a micro-distillation set up, and distillation is carried out at a temperature of 51°–53°C at 10 mm Hg pressure. The resulting material is the "erythro" form of 3-mercapto-2-butanol, having the structure:

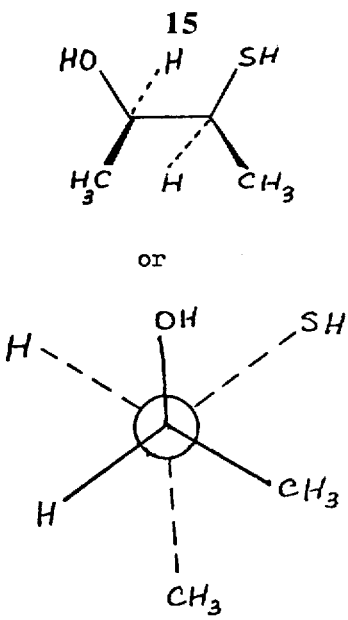

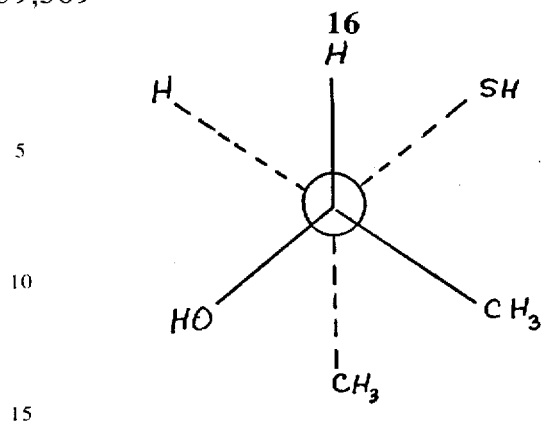

EXAMPLE II

SYNTHESIS OF THREO FORM OF 3-MERCAPTO-2-BUTANOL

Into a 250 ml three-necked flask equipped with heating mantle, condenser, hydrogen sulfide addition tube and magnetic stirrer, the following materials are added:

| Ingredients | Parts |
|---|---|
| Methanol | 100 cc |
| Diethyl amine | 1 cc |

The reaction mass is heated to 44°C and bubbling of hydrogen sulfide through the solution is then commenced. At the end of 1 hour, at a temperature of 55°C, 1.7 grams of cis-2,3-epoxybutane is added to the reaction mass. At the end of 3 hours at a reaction temperature of 58°C, H₂S addition is ceased, and the reaction mass is allowed to remain overnight at room temperature. The reaction mass is then heated to 51°–57°C and maintained at that temperature for a period of 5 hours while adding hydrogen sulfide. At the end of 1 hour, at a reaction temperature of 55°C, 1.7 grams of cis-2,3-epoxybutane is added. 2.7 grams of cis-2,3-epoxybutane is added at the end of 2 hours.

The reaction mass is then poured into 100 ml diluted hydrochloric acid (2%) thereby cause the reaction mass to be slightly acidic. The reaction mass is then extracted with two 35 ml portions of methylene dichloride, dried over anhydrous sodium sulfate and concentrated yielding 3.9 grams of a crude oil.

This crude oil is then distilled at 49°–49.5°C at 9–10 mm Hg pressure yielding 1.6 grams of the threo form of 3-mercapto-2-butanol having the structure:

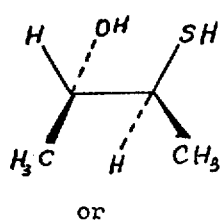

EXAMPLE III

SYNTHESIS OF THE CIS-ISOMER OF 2,3-BUTANE EPISULFIDE FROM CIS-2,3-EPOXYBUTANE 11.0 Grams of cis-2,3-epoxybutane is added to a stirring solution of 13 grams of KSCN in 10 ml water and 7 ml 95% aqueous ethanol. The solution turns a light greenish-yellow. At the end of 6 hours, the reaction mass is no longer stirred. The reaction mass remains quiescent overnight. The reaction mass is then stirred over a period of 8 hours and then allowed to remain quiescent overnight.

6 Grams of KSCN, 10 ml water and 5 ml aqueous 95% ethanol are then added to the reaction mass which is stirred for a period of 4.5 hours.

The reaction mass (organic layer) is then dried over anhydrous sodium sulfate and distilled in a micro-distillation apparatus at 39°C and 125 mm Hg pressure yielding the cis isomer of 2,3-butane episulfide, having the structure:

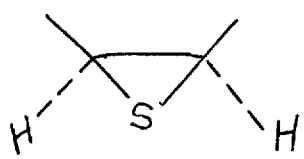

EXAMPLE IV

SYNTHESIS OF TRANS ISOMER OF 2,3-BUTANE EPISULFIDE FROM TRANS 2,5-EPOXYBUTANE

11 Grams of trans-2,3-epoxybutane is admixed with 13 grams KSCN, 10 ml water and 7 ml 95% aqueous ethanol. The reaction mass is stirred at room temperature for a period of 2 days. 6 Grams of KSCN, 10 ml water and 5 ml 95% aqueous ethanol is then added to the reaction mass which is stirred for another 24 hours. The reaction mass is then allowed to remain quiescent for a period of 5 days. The upper organic phase is then removed and dried over anhydrous sodium sulfate and distilled at 33°C and 95 mm Hg pressure yielding the trans isomer of 2,3-butane episulfide, having the structure:

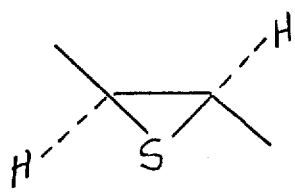

EXAMPLE V

SYNTHESIS OF ERYTHRO-ERYTHRO 3((2-MERCAPTO-1-METHYLPROPYL)THIO)-2-BUTANOL

To a mixture of refluxing methanol (25 cc) and diethyl amine (10 drops) is added 1 gram of erythro 3-mercapto-2-butanol and 0.83 g of trans-2,3-butane episulfide and the refluxing continued for 7 hours.

The reaction mass is then allowed to remain overnight at room temperature after which period it is heated to 56°C for a period of 5.5 hours. GLC analysis indicated that most of the reactants are no longer present. The resultant (erythro-erythro 3((2-mercapto-1-methylpropyl) thio)-2-butanol having the structure:

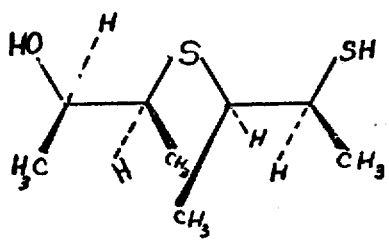

is isolate 5 via preparatory gas liquid chromatography on 8' × ¼'' glass 5% Carbowax 20M (polyethylene glycol terminated with terephthalic acid), and analyzed by mass spectral analysis, NMR analysis and IR analysis which confirm the aforementioned structure. FIG. 1 is the NMR spectrum for this material. FIG. 2 is the infrared spectrum for this material.

EXAMPLE VI

SNYTHESIS OF ERYTHRO-THREO 3 ((2-MERCAPTO-1-METHYLPROPYL)THIO)-2-BUTANOL

To a solution of methanol (25 cc) and diethyl amine (10 drops) at 50°C is added 1.0 g of erythro 3-mercapto-2-butanol (Example I) and cis-2,3-butane episulfide which is then stirred at a temperature of 50°C for a period of 2 hours. The reaction mass is then allowed to remain overnight at room temperature after which period of time is heated for a period of 8 hours at 50°C. The reaction mass is then allowed to remain overnight after which time it it is heated to 50°C and caused to remain at 50°C with stirring over a period of 8 hours. When GLC analysis indicates that most of the starting material has reacted, the reaction mass is cooled down. The product is isolated via GLC (same conditions as Example V). Mass spectral, IR and NMR analyses are consistent with erythro-threo 3 ((2-mercapto-1-methylpropyl) thio)-2-butanol having the structure:

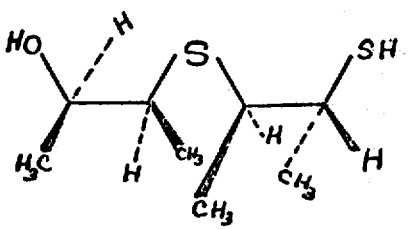

FIG. 3 is the NMR spectrum for this material. FIG. 4 is the infrared spectrum for this material.

EXAMPLE VII

SYNTHESIS OF THREO-ERYTHRO 3 ((2-MERCAPTO-1-METHYLPROPYL)THIO)-2-BUTANOL

To a mixture of refluxing methanol (30cc) and dietyl amine (15 drops) at 64°C is added 0.8 grams of threo-3-mercapto-2-butanol produced according to Example II and 0.3 grams of trans-2,3-butane episulfide produced according to Example IV. The refluxing is continued at 64°C for a period of 4 hours. The reaction mass is then allowed to remain overnight at room temperature after which period of time it is again heated to 64°C and remains at 64°C for a period of 3 hours. When GLC analysis indicates that most of the starting material is reacted the product is isolated via perparative gas liquid chromatography on an 8' × ¼'' glass 5% Carbowax 20M (polyethylene glycol-terephthalic acid terminated) column for mass spectral, NMR and IR analyses. The isolated product is threo-erythro 3 ((2-mercapto-1-methylpropyl) thio)-2-butanol having the structure:

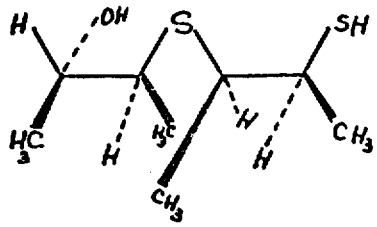

FIG. 5 is the NMR spectrum for this material. FIG. 6 is the infrared spectrum for this material.

EXAMPLE VIII

SYNTHESIS OF THREO-THREO 3 ((2-MERCAPTO-1-METHYL-PROPYL)THIO)-2-BUTANOL

To a refluxing mixture of methanol (30 cc) and diethyl amine (15 cc) at 59°C is added 0.8 grams of threo-3-mercapto-2-butanol produced according to Example II and 0.3 grams of cis-2,3-butane episulfide produced according to Example III (0.3 grams). The reaction mass is refluxed for a period of 5 hours at 59°–64°C, after which time it is allowed to remain at room temperature overnight. The reaction mass is then reheated to 61°C and allowed to remain at that temperature for a period of 3 hours after which GLC analysis indicated that most of the starting material is reacted. The major product is isolated via GLC (same conditions as Example VII) and analyzed via mass spectral, NMR and IR analyses to be the threo-threo 3((2-mercapto-1-methylpropyl) thio)-2-butanol having the structure:

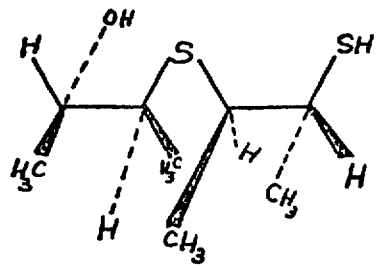

FIG. 7 is the NMR spectrum for this material. FIG. 8 is the infrared spectrum for this material.

EXAMPLE IX

The following ingredients are refluxed for 4 hours:

| Ingredient | Parts |
|---|---|
| L-Cysteine hydrochloride | 0.9 |
| Carbohydrate-free vegetable protein hydrolysate | 30.9 |
| Thiamine hydrochloride | 0.9 |
| Water | 67.30 |

The resulting mixture is then aged for 3 days and an aliquot portion is withdrawn and dried. Based on the weight of the dry solid obtained, sufficient gum arabic is added to the batch to provide a composition containing one part by weight of gum arabic. The composition is then spray-dried.

The spray-dried product is used at the rate of 1% to prepare a broth. The threo-erythro form of 3((2-mercapto-1-methylpropyl) thio)-2-butanol added at the rate of 0.5 ppm prepared according to the process of Example VII produced a pleasant liver taste, not found without the addition of this chemical.

EXAMPLE X

To a portion of essentially flavorless salad dressing, the erythro-erythro form of 3((2-mercapto-1-methylpropyl) thio)-2-butanol produced according to Example VI is added at the rate of 1.0 ppm. The resulting product has a pleasant cooked onion note. The salad dressing is a mixture of the following:

| Ingredient | Parts |
|---|---|
| Black Pepper oil | 3 |
| Nutmeg oil | 3 |
| Celery oil | 3 |
| Lemon oil | 3 |
| Mustard oil | 1 |
| Vinegar-citric acid (50:50 mixture) | 120 |
| Starch paste prepared from tapioca flour-water (50:50 mixture) | 300 |
| Liquid egg yolks | 210 |
| Sodium chloride | 10 |
| Sucrose | 10 |
| Mustard | 20 |
| Locust Bean gum | 6 |

EXAMPLE XI

An imitation cheese flavor is formed by mixing the following ingredients:

| Ingredient | Parts |
|---|---|
| Butyl butyryl lactate | 2.0 |
| Iso-valeric acid | 2.0 |
| Ethyl butyrate | 2.0 |
| Butyric acid | 3.0 |
| Caproic acid | 1.0 |
| Methyl amyl ketone | 10.0 |
| Ethyl alcohol (95% aqueous solution) | 80.0 |
| Propylene glycol | 900.0 |

To the foregoing cheese flavor is added 1 part of the erythro-erythro form of 3((2-mercapto-1-methylpropyl)-2-butanol produced according to the process of Example VI.

The foregoing mixture is then added to cacciacavallo cheese in the ratio of 0.5%. The resulting blend is heated to a molten mixture (at 90°C) and then quick-chilled at −20°C over a period of 1 hour. The resulting cheese has a cooked onion note.

EXAMPLE XII

The following spice oil is prepared:

| Ingredient | Parts |
|---|---|
| Oil of nutmeg | 500.0 |
| Oil of sweet marjoram | 150.0 |
| Oil of pimenta berries | 100.0 |
| Oil of mustard | 12.5 |
| Oil of thyme white | 37.5 |
| Oil of black pepper | 50.0 |
| Oil of cloves | 25.0 |
| Oleoresin of capsicum | 75.0 |
| Oleoresin of giner, alcoholic | 50.0 |

To the foregoing oil, five parts of the following mixture is added:

| Ingredient | Parts |
|---|---|
| 2,5-dimethyl-4-acetyl thiazole | 4 |
| Threo-erythro form of 3((2-mercapto-1-methylpropyl) thio)-2-butanol produced according to Example VII | 6 |
| Ethyl alcohol (95% aqueous solution) | 90 |

The above material is added to an edible spun synthetic soy-protein (manufactured by Swift & Company) at the rate of 0.02%. The resulting proteinaceous product has a distinct taste reminiscent of broiled liver.

EXAMPLE XIII

A beef liver gravy is made by formulating a composition in the amounts indicated:

| Ingredient | Parts |
|---|---|
| Cornstarch | 10.50 |
| The spray-dried product of Example XII | 3.00 |
| Caramel color | .30 |
| Garlic powder | .05 |
| White pepper | .05 |
| Salt | 2.00 |
| Monosodium glutamate | .20 |

To one unit of gravy flavor concentrate, 8 ounces of water are added, and the mixture is stirred thoroughly to disperse the ingredients brought to a boil, simmered for 1 minute and served. This "meatless" gravy exhibits a liver like flavor.

EXAMPLE XIV

The following ground sausage mixture is prepared:

| Ingredient | Parts |
|---|---|
| Ground beef | 200 |
| Beef suet | 120 |
| Ice/NaCl (50:50 mixture) | 200 |
| Potato flour | 100 |
| Anhydrous bread crumbs | 140 |
| Dry milk powder | 20 |
| Standard spice flavor containing: | 10 |
| Oil of cumin | 1.0 gm |
| Oil of mustard | 3.3 gm |
| Oil of celery | 3.3 gm |
| Oil of ginger | 5.2 gm |
| Oil of cloves | 14.6 gm |
| Oil of coriander | 17.6 gm |
| Oil of pimenta berries | 22.0 gm |
| Oil of black pepper | 43.0 gm |

-continued

| | |
|---|---|
| Oleoresin capsicum | 390.0 gm |
| Oil of nutmeg | 500.0 mg |

To the above mixture, 0.02% by weight of the following mixture is added:

| Ingredient | Parts |
|---|---|
| 2,4-dimethyl-5-ethyl thiazole | 4 |
| Threo-erythro of 3((2-mercapto-1-methylpropyl) thio)-2-butanol produced according to Example VII | 6 |
| Ethyl alcohol (95%) | 90 |

The resulting mixture is then incorporated into a sausage and encased in the usual manner. The encases sausage is heated in water at a temperature of 160°–180°F for a period of 2 hours. This sausage has a liver-like note reminiscent of the taste of a sausage made with the addition of liver.

EXAMPLE XV

A mixture of 8.8 gm of cysteine-hydrochloride, 8.8 gm of thiamine hydrochloride and 300.0 of carbohydrate-free vegetable protein hydrolysate is brought to a standard weight of 1000 grams by the addition of water, and adjusted to 4.75 pH with acid or base as required. This mixture is then boiled under reflux conditions at atmospheric pressure for 4 hours and allowed to cool.

After the mixture is allowed to cool, one gram of erythro-threo form of 3((2-mercapto-1-methylpropyl) thio)-2-butanol produced according to Example VI is added thereto. The resulting mixture thus obtained has an excellent "potroast" like meat flavor.

EXAMPLE XVI

The following are homogeneously admixed at 77°F:

| Ingredients | Parts |
|---|---|
| Vegetable shortening | 625.0 |
| Salt | 330.0 |
| Glutamic acid | 5.0 |
| L-Cysteine hydrochloride | 10.0 |
| Glycine | 5.0 |
| Beta-Alanine | 1.3 |
| Taurine | 20.0 |
| Mixture of di-sodium inosinate and di-sodium guanylate | 3.0 |
| Erythro-threo form of 3((2-mercapto-1-methylpropyl) thio)-2-butanol produced according to Example VI | 0.7 |

This mixture is heated to 300°F for 30 seconds. After cooling to 100°F, 0.12 part of diacetyl and 0.10 part of hexanal are added. The resulting mixture has an excellent roasted sulfury meat note.

EXAMPLE XVII

The following materials are homogeneously mixed at 77°F:

| Ingredients | Parts |
|---|---|
| Vegetable shortening | 625.0 |
| Salt | 330.0 |
| Glutamic acid | 5.2 |
| L-Cysteine hydrochloride | 10.0 |
| Glycine | 5.2 |
| Beta-Alanine | 1.3 |
| Taurine | 20.0 |
| Mixture of di-sodium inosinate and di-sodium guanylate | 3.3 |

The mixture is heated to 300°F for 30 seconds. After cooling to 100°F, 0.12 parts of diacetyl and 0.10 parts of hexanal are added. After aging the resulting mixture for 3 hours, 4 parts of erythro-threo from of 3((2-mercapto-1-methylpropyl) thio)-2-butanol produced according to Example VI is added.

The resulting mixture is aged for ten hours to provide a material having a sulfury, roasted meat aroma.

EXAMPLE XVIII a. Cysteine hydrochloride in the amount of 8.8 gm is refluxed at 215°F under atmospheric pressure for 4 hours with a mixture of 309 gm of hydrolyzed vegetable protein, 8.8 gm thiamine HCl, and 674 gm of water. Subsequent to the reflux, the mixture is cooled and 6.0 ppm of erythro-threo form of 3((2-mercapto-1-methylpropyl) thio)-2-butanol produced according to Example VI is added and intimately admixed with the composition. The mixture has an excellent roasted flavor.

b. The flavor produced in Example XVIII (a) is added to:

1. a commercial dry type pet food;
2. a semi-moist type pet food; and
3. wet or canned pet food When so added at levels of 0.5%, 1%, 1.5%, 2%, 2.5% and 3% (by weight of foodstuff) highly palatable pet foods are obtained.

EXAMPLE XIX

The composition prepared in Example XVI is dissolved in propylene glycol to provide a 0.1% solution. This solution in the amount of 1.0 gm is added to 7.3 gm of a soup base consisting of:

| Ingredients | Parts |
|---|---|
| Fine ground sodium chloride | 35.0 |
| Hydrolyzed vegetable protein | 27.8 |
| Monosodium glutamate | 18.0 |
| Sucrose | 11.0 |
| Beef fat | 5.5 |
| Caramel color | 2.7 |

The composition of Example XVII (0.005 gm) when added to the above soup base also provides a soup having good meat flavor.

EXAMPLE XX

A. Preparation of Spray-Dried Product

The following ingredients are refluxed for 4 hours, aged for 3 days and spray-dried to produce a solid product having a beef flavor. Before drying sufficient gum arabic is added to provide a composition containing 0.5 parts gum arabic and one part flavor solid.

| Ingredients | Parts |
|---|---|
| L-Cysteine hydrochloride | 1.32 |
| Carbohydrate-free vegetable protein hydrolyzate | 22.05 |
| Ethyl thioacetate | 22.00 |
| Thiamine hydrochloride | 1.32 |
| Beta-Alanine | 0.50 |
| Water | 52.81 |

B. Preparation of Beef Gravy:

A beef gravy concentrate is produced by formulating a gravy flavor composition of the ingredients and in the amounts indicated:

| Ingredients | Parts |
|---|---|
| Flour | 34.20 |
| Cornstarch | 36.00 |
| Beef fat | 61.20 |
| Sodium chloride | 9.90 |
| Monosodium glutamate | 7.20 |
| Carbohydrate-free vegetable protein hydrolyzate | 19.80 |
| Toasted onion powder | 2.50 |
| White pepper | 0.4 |
| The spray-dried product of Part XXI (A) above | 5.40 |

To this mixture is added, at the rate of 4.0 ppm, the erythro-threo form of 3((2-mercapto-1-methylpropyl) thio)-2-butanol produced according to the process of Example VI. The said thionol improves the bloody, tangy beef extract flavor character of the mixture.

To one unit of said gravy flavor concentrate 24 ounces of water are added, and the mixture is stirred thoroughly to disperse the ingredients, brought to a boil, simmered for one minute and served. The meatless gravy obtained shows excellent bloody, tangy beef extract flavor.

EXAMPLE XXI

A. Preparation of Flavor Mixture

The following mixture is prepared:

| Ingredients | Parts |
|---|---|
| 4-Methyl-5-beta-hydroxyethyl thiazole | 53.0 |
| 5-Methyl furfural | 5.0 |
| Threo-threo form of 3((2-mercapto-1-methylpropyl thio)-2-butanol produced according to the process of Example VIII | 2.0 |
| Guaiacol | 1.5 |
| Methyl mercaptan | .5 |
| Tetrahydrothiophen-3-one | 5.0 |
| Methional | 1.0 |
| Tetrahydrofurfuryl alcohol | 32.0 |

B. Preparation of Soup

A beef noodle soup is prepared by mixing together:

| Ingredients | Parts |
|---|---|
| Sodium chloride | 50 |
| Mixture of Part (A) of this Example | 30 |
| Gelatin | 10 |
| Monosodium glutamate | 4 |
| Caramel color | 4 |
| Garlic powder | 1 |
| White pepper, ground | 6 |
| Mixed vegetable base | 360 |

Three cups of water are added to the above mixture and this mixture is brought to a full boil, simmered for five minutes and is then ready to serve.

The threo-threo form of 3((2-mercapto-1-methylpropyl) thio)-2-butanol imparts a roasted garlic note to the soup.

EXAMPLE XXII

A. Preparation of Flavor Mixture:

The following mixture is prepared:

| Ingredients | Parts |
|---|---|
| 4-Methyl-5-beta-hydroxyethyl thiazole | 55.0 |
| Threo-threo form of 3((2-mercapto-1-methylpropyl) thio)-2-butanol produced according to the process of Example VIII | 5.0 |
| Amyl alcohol | 20.0 |
| Methional | 2.0 |
| Hexanal | 5.0 |
| Diacetyl | 10.0 |
| Ethyl disulfide | 3.0 |

B. Preparation of Shake Composition

A "shake" composition for enhancing the flavor of meats is prepared by admixing the following ingredients:

| Ingredients | Parts |
|---|---|
| Tumeric | 25.0 |
| Paprika | 25.0 |
| Oregano | 15.0 |
| Monosodium glutamate (fine grind) | 25.0 |
| Sodium chloride (fine grind) | 510.0 |
| Mixture of Part (A) of this Example | 400.0 |

When sprinkled on meat, the above mixture imparts thereto a garlic and roasted note effect and this effect is caused by the presence of threo-threo form of 3((2-mercapto-1-methylpropyl) thio)-2-butanol.

EXAMPLE XXIII

A. Preparation of Flavor Mixture

The following mixture is prepared:

| Ingredients | Parts |
|---|---|
| 4-Methyl-5-beta-hydroxyethyl thiazole | 55.0 |
| Amyl alcohol | 10.0 |
| Methional | 2.0 |
| Hexanyl | 5.0 |
| Diacetyl | 10.0 |
| Ethyl disulfide | 3.0 |
| Erythro-threo form of 3((2-mercapto-1-methylpropyl) thio)-2-butanol produced according to the process of Example VI | 1.0 |

B. Preparation of Shake Composition

A "shake composition" for enhancing the flavor of meats is prepared by admixing the following ingredients:

| Ingredients | Parts |
|---|---|
| Tumeric | 25.0 |
| Paprika | 25.0 |
| Oregano | 15.0 |
| Monosodium glutamate (fine grind) | 25.0 |
| Sodium chloride (fine grind) | 510.0 |
| Mixture of Part (A) of this Example | 5.0 |
| Maltol dextrin | 395.0 |

When sprinkled on meat, the above mixture imparts thereto a roasted meat note effect and this effect is caused by the presence of erythro-threo form of 3((2-mercapto-1-methylpropyl) thio)-2-butanol.

What is claimed is:

1. A process for altering, modifying or enhancing the alliaceous aroma and flavor properties of a foodstuff which comprises adding to said foodstuff from 0.1 ppm up to 30 ppm, based on the weight of the foodstuff, of a sulfur-containing compound having a formula selected from the group consisting of:

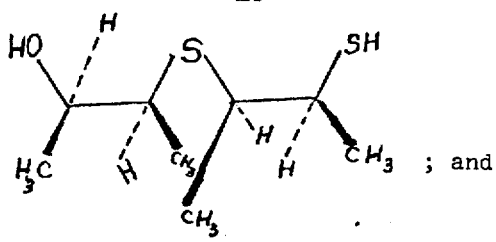 ; and

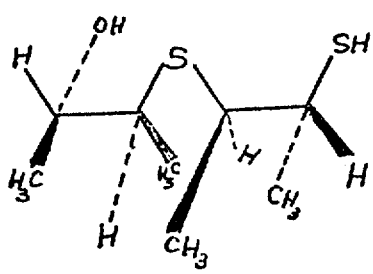

2. The process of claim 1 wherein said sulfur-containing compound is of the formula:

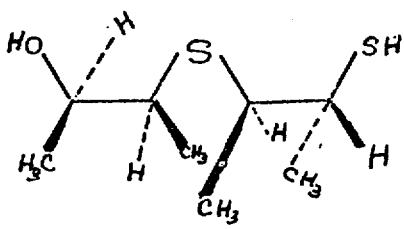

3. The process of claim 1 wherein said sulfur-containing compound is represented by the formula:

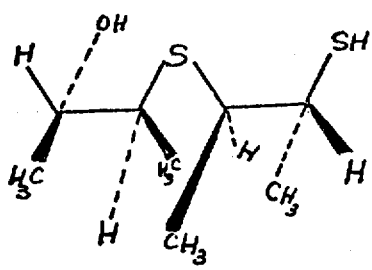

4. A composition useful in altering, enhancing or modifying the alliacious aroma or taste of a foodstuff comprising:
i. from $1 \times 10^{-9}$ up to 90% by weight of at least one sulfur-containing compound of the formula selected from the group consisting of:

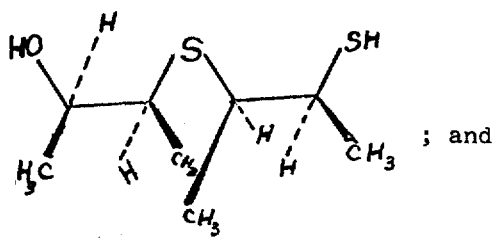 ; and

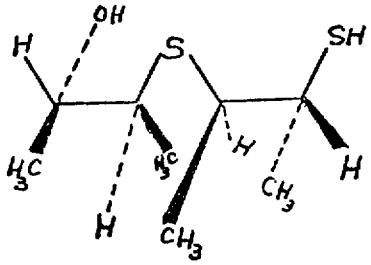

ii. an adjuvant selected from the group consisting of: 4-methyl-5-(beta-hydroxy ethyl) thiazole, ethyl thioacetate, furfural, benzaldehyde, methional, hexanal, diacetyl, amyl alcohol, ethyl disulfide, methyl mercaptan, 2,4-decadienal, 2,4-decadienol, 2,5-dimethyl-2,5-dihydroxy-1,4-dithiane, 1,3-dithiolane, 2-methyl-1,3-dithiolane, 3,5-dimethyl-1,2-dithiolane, 3-methyl-1,2-dithiolane, 2,4-dimethyl-1,3-dithiolane, 4-methyl-1,3-dithiolane, 1,2-dithiane, 1,3-dithiane, 1,4-dithiane, 2-methyl-1,3-dithiane, 2,4-dimethyl-1,3-dithiane, 4-methyl-1,3-dithiane, 2,4,6-trimethyl-1,3-dithiane, thiamine hydrochloride, 2-methyl-1-butanethiol, 4-mercapto-2-butanone, 3-mercapto-2-pentanone, furfuryl alcohol, 2-mercapto propionic acid, methyl pyrazine, 2-ethyl-3-methyl pyrazine, tetrahydrofurfuryl alcohol, tetrahydrothiophen-3-one, tetramethyl pyrazine, dipropyl disulfide, methyl benzyl disulfide, 2-butyl thiophene, 2,3-dimethyl thiophene, 5-methylfurfural, 3-acetyl-2,5-dimethyl-furan, guaiacol, phenyl acetaldehyde, delta-decalactone, d-limonene, acetoin, amyl acetate, maltol, ethyl butyrate, levulinic acid, piperonal, ethyl acetate, n-octanal, n-pentanal, 2-isobutyl thiazole, propyl propenyl disulfide, 3-mercapto-2,5-dimethylfuran, methyl-3-(2,5-dimethylfuryl) disulfide, propyl propenyl trisulfide, 2,6-dimethyl pyrazine, acetophenone, 2-methyl-2-butenal, furfuryl mercaptan, acetyl propionyl, 3-thioacetyl-2,5-dimethylfuran, bis-3-(2,5-dimethylfuryl) disulfide and bis-3-(2-methylfuryl) disulfide; and iii. an edible carrier compatible with said sulfur-containing compound.

5. A flavoring composition as defined in claim 4 wherein said sulfur-containing compound is represented by the formula:

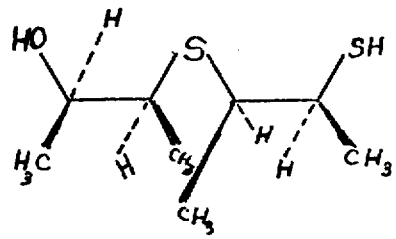

6. A flavoring composition as defined in claim 4 wherein said sulfur-containing is represented by the formula:

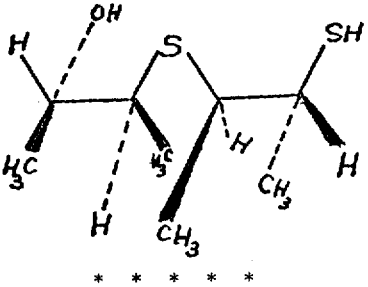

* * * * *